(12) United States Patent
Zheng et al.

(10) Patent No.: US 9,037,870 B1
(45) Date of Patent: May 19, 2015

(54) METHOD AND SYSTEM FOR PROVIDING A ROTATING KEY ENCRYPTED FILE SYSTEM

(71) Applicant: Intuit Inc., Mountain View, CA (US)

(72) Inventors: Peter Xiaohu Zheng, San Jose, CA (US); Toan Huynh, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 14 days.

(21) Appl. No.: 13/969,351

(22) Filed: Aug. 16, 2013

(51) Int. Cl.
*G06F 21/00* (2013.01)
*G06F 12/14* (2006.01)
*H04L 9/00* (2006.01)
*G06F 21/60* (2013.01)
*H04L 9/08* (2006.01)

(52) U.S. Cl.
CPC .......... *G06F 21/602* (2013.01); *G06F 12/1408* (2013.01); *G06F 12/1466* (2013.01); *H04L 9/08* (2013.01)

(58) Field of Classification Search
None
See application file for complete search history.

(56) References Cited

U.S. PATENT DOCUMENTS

| | | | |
|---|---|---|---|
| 5,003,596 A * | 3/1991 | Wood | 380/28 |
| 6,981,041 B2 * | 12/2005 | Araujo et al. | 709/224 |
| 8,826,013 B1 * | 9/2014 | Kodukula et al. | 713/165 |
| 2009/0103724 A1 * | 4/2009 | Tamai | 380/44 |
| 2011/0191595 A1 * | 8/2011 | Damian et al. | 713/189 |

* cited by examiner

*Primary Examiner* — Fatoumata Traore
(74) *Attorney, Agent, or Firm* — Hawley Troxell Ennis & Hawley LLP; Philip McKay (57) ABSTRACT

A file system data is divided into two or more data blocks. A unique encryption key is assigned to each data block with the encryption key assigned to each data block being distinct from other encryption keys used to encrypt the other data blocks and each of the data blocks is encrypted using its assigned encryption key. One of the data blocks within the file system is then selected and decrypted using the distinct encryption key assigned to the selected data block and a new encryption key, distinct for the previously assigned encryption key, is assigned to the selected data block and the selected data block is re-encrypted using the new encryption key. This process is then repeated for each data block on a sequential/cyclic and continually rotating basis.

24 Claims, 2 Drawing Sheets

METHOD AND SYSTEM FOR PROVIDING A ROTATING KEY ENCRYPTED FILE SYSTEM

BACKGROUND

When electronic data, such as file system data, is sensitive enough to require encryption, one of the fundamental actions required to ensure the encryption of the data provides the desired level of security is to change, or rotate, the encryption key used to encrypt and decrypt the electronic data on a periodic basis. The changing of the encryption key is necessary to prevent the encryption key, and therefore the encrypted data, from being compromised. Consequently, currently, encryption keys are changed on a periodic or scheduled basis and or on an on-demand basis in response to a lost or potentially compromised encryption key.

To some degree, changing the encryption key used to encrypt data is effective in preventing encrypted data from being compromised. However, currently, in order to change the encryption key used to encrypt and decrypt file system data the entirety of the file system data must first be decrypted using the existing encryption key and then re-encrypted using a newly assigned encryption key. This process is complicated and typically involves making the entirety of the encrypted data inaccessible for a significant period of time; thereby interrupting live traffic and consuming significant amounts of processor power and other resources.

As a result of the situation described above, the changing of encryption keys is often performed less frequently than would be optimal for security purposes in order to avoid interruption of live traffic and the consumption of processing resources. However, when the encryption keys are changed less frequently, the vulnerability to compromise of both the encryption key and the encrypted data is often significantly increased.

What is needed is a method and system that allows the changing of encryption keys more frequently but does not require making the entirety of the encrypted data inaccessible for a significant period of time, or interrupting live traffic and consuming significant amounts of processor power and other resources.

SUMMARY

In accordance with one embodiment, a method and system for providing a rotating key encrypted file system includes a process for providing a rotating key encrypted file system whereby, in one embodiment, access to a file system containing file system data is obtained and two or more data blocks within the file system are designated, each of the two or more data blocks including part of the file system data.

In one embodiment, a unique encryption key is assigned to each data block of the two or more data blocks, with the encryption key assigned to each data block being distinct from other encryption keys used to encrypt the other data blocks of the two or more data blocks within the file system. In one embodiment, each of the two or more data blocks within the file system is then encrypted using the distinct encryption key assigned to that data block.

In one embodiment, one of the two or more data blocks within the file system is selected and decrypted using the distinct encryption key assigned to the selected data block. A new encryption key, distinct from the previously assigned, or aging/old, encryption key, is then assigned to the selected data block and the selected data block is re-encrypted using the new encryption key.

In one embodiment, the process of selecting one of the two or more data blocks within the file system, decrypting the selected data block using the distinct encryption key assigned to the selected data block, and then re-encrypting the selected data block using a new encryption key that is distinct from the previously assigned encryption key is then repeated for each data block on a sequential/cyclic and continually rotating basis such that at any given time only one data block of the two or more data blocks within the file system is being encrypted using a new encryption key.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment, a process for providing a rotating key encrypted file system includes one or more applications, such as software packages, modules, or systems, implemented on one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, a method and system for providing a rotating key encrypted file system includes a process for providing a rotating key encrypted file system whereby, in one embodiment, access to a file system containing file system data is obtained and two or more data blocks within the file system are designated, each of the two or more data blocks including one or more parts of the file system data.

In various embodiments, the file system containing file system data can be any file system as discussed herein, and/or as known in the art at the time of filing, and/or as developed after the time of filing. As a specific illustrative example, in one embodiment, the file system containing the file system data is an Amazon Web Services (AWS) Elastic Compute Cloud (EC2) file system.

In one embodiment, two or more data blocks within the file system are designated, each of the two or more data blocks including one or more parts of the file system data. As a specific illustrative example, in one embodiment, "N" data blocks are designated within the file system, where "N" is a whole number greater than one.

In this manner, the file system, and file system data, is partitioned into multiple distinct data blocks.

In one embodiment, a unique encryption key is assigned to each data block of the two or more data blocks, with the encryption key assigned to each data block being distinct from other encryption keys used to encrypt the other data blocks of the two or more data blocks within the file system. In one embodiment, each of the two or more data blocks is then initially encrypted using the respective encryption key assigned to that data block.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted using their respective ones of the "N+1" encryption keys.

In one embodiment, once each of the two or more data blocks is then initially encrypted, one of the two or more data blocks within the file system is selected and decrypted using the unique encryption key assigned to the selected data block. A new encryption key, distinct from the aging/old, or previously assigned, encryption key, is assigned to the selected data block and the selected data block is re-encrypted using the new encryption key.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted using their respective ones of the "N+1" encryption keys. Then, a selected one of the "N" data blocks is decrypted using its aging/old, or previously, assigned, one of the "N+1" encryption keys. Then, the previously unassigned "+1" encryption key of the "N+1" encryption keys is assigned to the selected data block as a new encryption key and the selected one of the "N" data blocks is re-encrypted using the new, or "+1" encryption key.

In one embodiment, the process of selecting one of the two or more data blocks within the file system, decrypting the selected data block using the distinct encryption key assigned to the selected data block, and then re-encrypting the selected data block using a new encryption key that is distinct from the previously assigned encryption key, is repeated for each data block on a sequential/cyclic and continually rotating basis such that, at any given time, only one data block of the two or more data blocks within the file system is being encrypted using a new encryption key, e.g., is being rekeyed.

As a specific illustrative example of one embodiment of one implementation of process for providing a rotating key encrypted file system, assume the file system is implemented/operated in a Linux operating system environment and, more particularly, is implemented as an Amazon Web Services (AWS) Elastic Compute Cloud (EC2) file system.

In this specific illustrative example, the process for providing a rotating key encrypted file system is a kernel-based system residing between the upper virtual file system layers and the low-level block device driver to implement transparent encryption and decryption. However, in other illustrative examples and embodiments the process for providing a rotating key encrypted file system is independent of the file system type.

As noted, in this specific illustrative example, the file system is virtually divided into "N" data blocks with each data block containing one or more parts of the file system data. As also noted above, in this specific illustrative example, "N+1" encryption keys are used to protect the designated "N" data blocks with the "+1", or previously unassigned, encryption key being used to replace an aging/old one of the "N" encryption keys assigned to a selected one of the "N" data blocks during a rekeying process of the selected one of the "N" data blocks.

In this specific illustrative example, Linux CryptoAPI is used to encrypt and or decrypt each of the "N" data blocks. In one embodiment, each of the assigned "N" encryption keys is used to protect continuous parts in the data blocks.

In one embodiment, the "N" data blocks are re-keyed, e.g., the data blocks are decrypted and then re-encrypted, on a cyclic and continually rotating basis using an automatic rekeying daemon, in one embodiment, called "Autorekee", running in a low priority mode such that at any given time only one data block of the two or more data blocks within the file system is being encrypted using a new encryption key. To this end, a part of a selected data block that is being re-keyed, will have two associated encryption keys; the previously assigned, or old/aging, encryption key and the new encryption key.

In this specific illustrated example, it is required that the encryption keys not remain within the AWS. Consequently, a REpresentational State Transfer (REST) service that will only respond to the AWS instance is provided. In this specific illustrative example, during the EC2 boot time, the process for providing a rotating key encrypted file system retrieves the encryption keys from the REST service. In this specific illustrative example, the encryption keys are mapped to a given Elastic Block Store IDentifcation (EBSID). In the specific illustrative example, the REST service is also used to send out the new, i.e., the "+1" encryption key and retire the old/aging, i.e., previously assigned, encryption key.

In one embodiment of this specific illustrative example, the process for providing a rotating key encrypted file system leverages the superblock to store metadata such as the total number of encryption keys, i.e., the value of the number "N+1"; the total number of data blocks, i.e., the value of the number "N"; the name of the previously assigned, i.e., aging or old, encryption key and the new encryption key; and/or the last block number that was rekeyed.

In one embodiment of this specific illustrative example, the metadata allows the process for providing a rotating key encrypted file system to keep track of which data block is being protected by two encryption keys, i.e., the old encryption key and the new encryption key, and which data block can be accessed with which encryption key, i.e., old or new.

In this specific illustrative example, the process for providing a rotating key encrypted file system leverages the page cache and bio infrastructure of the kernel to provide transparent encryption and decryption of the data using the encryption keys present in the kernel key management service.

In some cases, the work queue interface is used to enable the coalescing of multiple bio requests to reduce the overhead of individual bio requests for file system blocks. In other embodiments, similar implementations used by other encryption file systems, such as dm-crypt, are accommodated.

In instances where the encrypted file system data must be maintained in a page cache, encryption and decryption can be implemented to copy the data between the page cache and the user space buffer specified in the read/write and or other system calls.

For the relatively rare situations where input-output (I/O) access is made to a part of a data block that is currently being rekeyed, the I/O call is held off until the rekeying process is finished on that part of the data block. When the rekeying process is completed the block can then be accessed with the new encryption key.

In this specific illustrative example, a daemon called "Autorekee" runs continuously in the background of the AWS instance. The primary task of the Autorekee is to continuously rekey the data blocks with a new encryption key. In one embodiment, the Autorekee daemon works through each of the "N" data blocks in a sequential, and cyclic, manner.

A specific illustrative example of one algorithm used to generate the Autorekee daemon is represented by the following pseudo-code:

1. aging_key=get_current_aging_key( );
2. new_key=get_new_key( );
3. current_block=next_block(get_last_rekeyed_block( ));
4. while (true) {
5. rekey(current_block, aging_key, new_key);
6. current_block=next_block(current_block);
7. if (is_start_block_of_aging_section(current_block) {
8. new_key=retrieve_new_key_and_delete_old_key(
9. aging_key, EBS_ID)
10. aging_key=next_aging_key(aging_key)
11. }
12. }

In the Autorekee daemon pseudo code presented above, lines 1 through 3 are initialization statements, with line 3 retrieving the data block being rekeyed.

In the Autorekee daemon pseudo code presented above, line 5 performs the actual rekey which involves decrypting the data block with the aging, or previously assigned, encryption key and re-encrypting the data block with the new encryption key.

In the Autorekee daemon pseudo code presented above, lines 7 to 10 contain the logic for when a new part within a data block, or a data block, is reached. As seen in lines 8 to 10, if the current data block is the beginning of a new section, the current aging, or previously assigned, encryption key, and the new encryption key are associated with the next key pair.

The Autorekee daemon pseudo code presented above also handles cases where the Autorekee crashes and needs to resume. The progress of the Autorekee's location is continuously tracked as metadata in the superblocks. When the last part of the last data block is reached, Autorekee begins the rekeying process again at the first data block.

In this specific illustrative example, the process for providing a rotating key encrypted file system utilizes keyed hashes to enforce file integrity. In one embodiment, the hash list for a file consists of a separate message authentication code computed for every data block used by that file's contents. In one embodiment, this code is verified on every read and updated on every write operation on the corresponding data block. In one embodiment, the top hash, computed over the hash list itself, must be verified or updated for every read or write call.

As noted above, the specific illustrative example discussed above is but one illustrative example of one implementation of one embodiment of the process for providing a rotating key encrypted file system. Those of skill in the art will readily recognize that other implementations and embodiments are possible. Therefore the discussion above should not be construed as a limitation on the claims provided below.

Using the method and system for providing a rotating key encrypted file system discussed herein, the risk of file system data being compromised is significantly reduced by having the encryption keys continuously rotated throughout the file system. Consequently, the Time-To-Live (TTL) for each encryption key is extremely short. As a result, even if the encryption key were compromised, the attacker would only have a very short window to gain access to one section, i.e., one data block, of the file system.

In addition, using the method and system for providing a rotating key encrypted file system discussed herein, performance and data accessibility are negligibly affected with only minor overhead being added. Consequently, using the method and system for providing a rotating key encrypted file system discussed herein, encryption keys can be changed more frequently without the entirety of the encrypted data being inaccessible for any significant period of time and without interrupting live traffic or consuming significant amounts of processor power and other resources.

As discussed in more detail below, using the below embodiments, with little or no modification and/or user input, there is considerable flexibility, adaptability, and opportunity for customization to meet the specific needs of various users under numerous circumstances.

Hardware System Architecture

Figure 1:
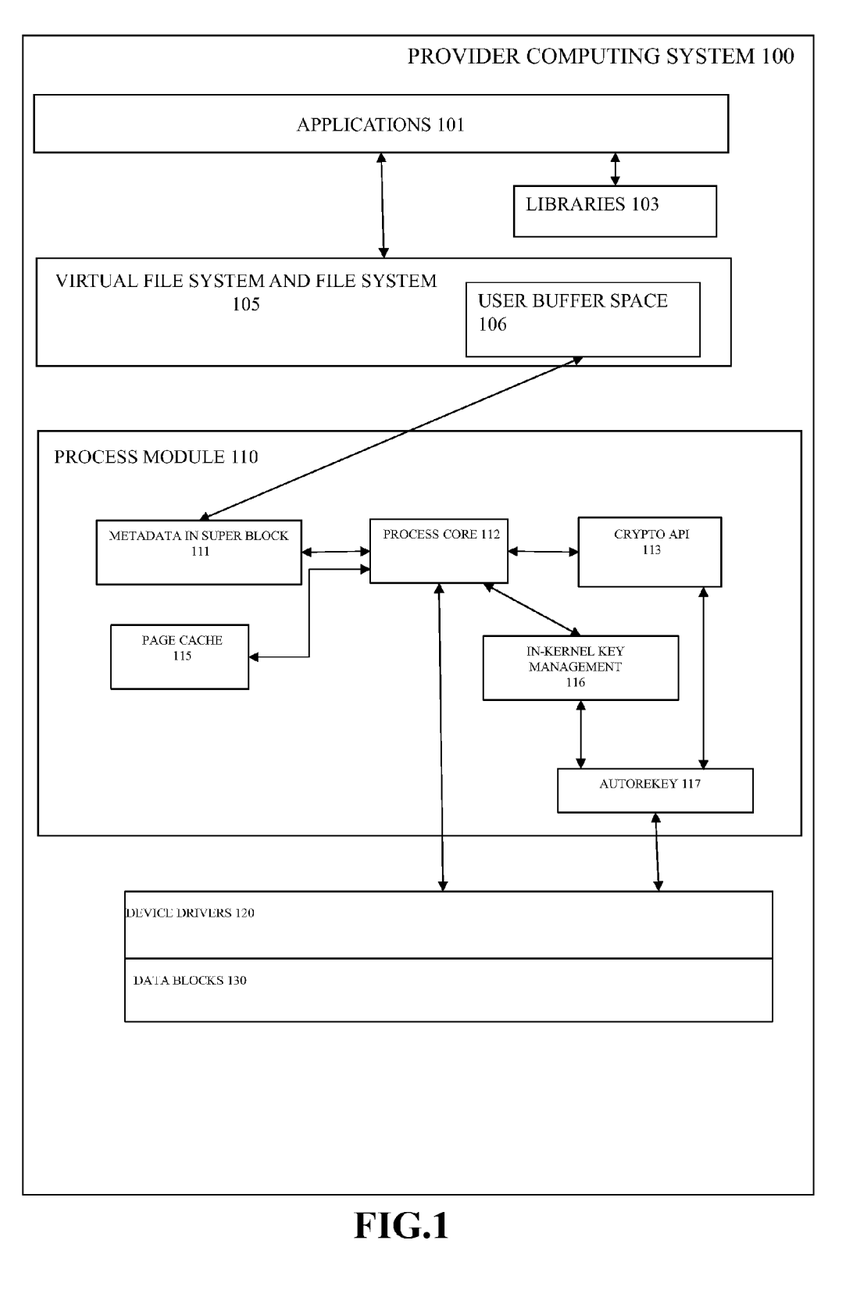
FIG. 1 is a block diagram of an exemplary hardware architecture for implementing one embodiment.

FIG. 1 is a block diagram of an exemplary hardware architecture for implementing one embodiment of a process for providing a rotating key encrypted file system, such as exemplary process 200 (FIG. 2) discussed herein.

Shown in FIG. 1 is a provider computing system 100.

In one embodiment, provider computing system 100 is any computing system as discussed herein, and/or as known in the art at the time of filing, and/or as developed thereafter, that includes components that can execute all, or part, of a process for providing a rotating key encrypted file system in accordance with at least one of the embodiments as described herein.

In one embodiment, the process for providing a rotating key encrypted file system is implemented/operated in a Linux operating system environment and, more particularly, is implemented as an Amazon Web Services (AWS) Elastic Compute Cloud (EC2) file system.

In one embodiment, applications 101 is in communication with libraries 103 and virtual file system and file system 105. In one embodiment, user buffer space 106 of virtual file system and file system 105 is in communication with metadata in super block 111 of process module 110.

In the specific illustrative example of FIG. 1, the process for providing a rotating key encrypted file system is coordinated and implemented, at least in part, in process module 110 via process core 112. In this embodiment, the process for providing a rotating key encrypted file system is a kernel-based system residing between the upper virtual file system layers, e.g., virtual file system and file system 105, and the low-level block device driver, e.g., device drivers 120, to implement transparent encryption and decryption. However, in other embodiments, the process for providing a rotating key encrypted file system is independent of the file system type.

In one embodiment, the file system data in virtual file system and file system 105 (not explicitly shown in FIG. 1) is virtually divided into "N" data blocks (not explicitly shown in FIG. 1) in data blocks 130, with each data block containing one or more parts of the file system data. As also noted above, in this specific illustrative example, "N+1" encryption keys are used to protect the designated "N" data blocks with the "+1", or previously unassigned, encryption key being used to replace an aging/old one of the "N" encryption keys assigned to a selected one of the "N" data blocks during a rekeying process of the selected one of the "N" data blocks.

In this specific illustrative example, a Linux Crypto API 113 is used to encrypt and or decrypt each of the "N" data blocks. In one embodiment, each of the assigned "N" encryption keys is used to protect continuous parts in the data blocks.

In one embodiment, the "N" data blocks are re-keyed, e.g., the data blocks are decrypted and then re-encrypted, on a cyclic and continually rotating basis using an automatic rekeying daemon, Autorekee 117, running in a low priority mode such that at any given time only one data block of the two or more data blocks within data blocks 130 is being encrypted using a new encryption key. To this end, a part of a selected data block that is being re-keyed, will have two associated encryption keys; the previously assigned, or old/aging, encryption key and the new encryption key.

In this specific illustrated example, it is required that the encryption keys not remain within the AWS. Consequently, a REpresentational State Transfer (REST) service that will only respond to the AWS instance is provided (not explicitly shown in FIG. 1). In this specific illustrative example, during the EC2 boot time, the process for providing a rotating key encrypted file system retrieves the encryption keys from the REST service. In this specific illustrative example, the encryption keys are mapped to a given Elastic Block Store IDentifcation (EBSID). In the specific illustrative example, the REST service is also used to send out the new, i.e., the "+1" encryption key and retire the old/aging, i.e., previously assigned, encryption key.

In one embodiment, the process for providing a rotating key encrypted file system leverages the superblock to store metadata in superblock 111, such as the total number of encryption keys, i.e., the value of the number "N+1"; the total number of data blocks, i.e., the value of the number "N"; the name of the previously assigned, i.e., aging or old, encryption key and the new encryption key; and/or the last block number that was rekeyed.

In one embodiment, metadata in superblock 111 allows in-kernel key management 116 to keep track of which data block is being protected by two encryption keys, i.e., the old encryption key and the new encryption key, and which data block can be accessed with which encryption key, i.e., old or new.

In this specific illustrative example, the process for providing a rotating key encrypted file system leverages the page cache 115 and bio infrastructure of the kernel to provide transparent encryption and decryption of the data using the encryption keys present in the in-kernel key management 116.

In some cases, the work queue interface is used to enable the coalescing of multiple bio requests to reduce the overhead of individual bio requests for file system blocks. In other embodiments, similar implementations used by other encryption file systems, such as dm-crypt, are accommodated.

In instances where the encrypted file system data must be maintained in page cache 115, encryption and decryption can be implemented to copy the data between page cache 115 and user space buffer 106 as specified in the read/write and or other system calls.

For the relatively rare situations where input-output (I/O) access is made to a part of a data block that is currently being rekeyed, the I/O call is held off until the rekeying process is finished on that part of the data block. When the rekeying process is completed the block can then be accessed with the new encryption key.

In this specific illustrative example, Autorekee 117 runs continuously in the background of the AWS instance. The primary task of Autorekee 117 is to continuously rekey the data blocks with a new encryption key. In one embodiment, Autorekee 117 works through each of the "N" data blocks in a sequential, and cyclic, manner.

A specific illustrative example of one algorithm used to generate Autorekee 117 is represented by the following pseudo-code:

1. aging_key=get_current_aging_key( );
2. new_key=get_new_key( );
3. current_block=next_block(get_last_rekeyed_block( ));
4. while (true) {
5. rekey(current_block, aging_key, new_key);
6. current_block=next_block(current_block);
7. if (is_start_block_of_aging_section(current_block) {
8. new_key=retrieve_new_key_and_delete_old_key(
9. aging_key, EBS_ID)
10. aging_key=next_aging_key(aging_key)
11. }
12. }

In the Autorekee 117 pseudo code presented above, lines 1 through 3 are initialization statements, with line 3 retrieving the data block being rekeyed.

In the Autorekee 117 pseudo code presented above, line 5 performs the actual rekey which involves decrypting the data block with the aging, or previously assigned, encryption key and re-encrypting the data block with the new encryption key.

In the Autorekee 117 pseudo code presented above, lines 7 to 10 contain the logic for when a new part within a data block, or a data block, is reached. As seen in lines 8 to 10, if the current data block is the beginning of a new section, the current aging, or previously assigned, encryption key, and the new encryption key are associated with the next key pair.

In the Autorekee 117 pseudo code presented above also handles cases where Autorekee 117 crashes and needs to resume. The progress of In the Autorekee 117's location is continuously tracked as metadata in metadata in super block 111. When the last part of the last data block is reached, In the Autorekee 117 begins the rekeying process again at the first data block.

In this specific illustrative example, the process for providing a rotating key encrypted file system utilizes keyed hashes to enforce file integrity. In one embodiment, the hash list for a file consists of a separate message authentication code computed for every data block used by that file's contents. In one embodiment, this code is verified on every read and updated on every write operation on the corresponding data block. In one embodiment, the top hash, computed over the hash list itself, must be verified or updated for every read or write call.

As noted above, the specific illustrative example discussed above is but one illustrative example of one implementation of one embodiment of the process for providing a rotating key encrypted file system. Those of skill in the art will readily recognize that other implementations and embodiments are possible. Therefore the discussion above should not be construed as a limitation on the claims provided below.

Process

In accordance with one embodiment, access to a file system containing file system data is obtained and two or more data blocks within the file system are designated, each of the two or more data blocks including part of the file system data.

In one embodiment, a unique encryption key is assigned to each data block of the two or more data blocks, with the encryption key assigned to each data block being distinct from other encryption keys used to encrypt the other data blocks of the two or more data blocks within the file system. In one embodiment, each of the two or more data blocks within the file system is then encrypted using the distinct encryption key assigned to that data block.

In one embodiment, one of the two or more data blocks within the file system is selected and decrypted using the distinct encryption key assigned to the selected data block. A new encryption key, distinct for the previously assigned, or aging/old, encryption key, is then assigned to the selected data block and the selected data block is re-encrypted using the new encryption key.

In one embodiment, the process of selecting one of the two or more data blocks within the file system, decrypting the selected data block using the distinct encryption key assigned to the selected data block, and then re-encrypting the selected data block using a new encryption key that is distinct from the previously assigned encryption key is then repeated for each data block on a sequential/cyclic and continually rotating basis such that at any given time only one data block of the two or more data blocks within the file system is being encrypted using a new encryption key.

Figure 2:
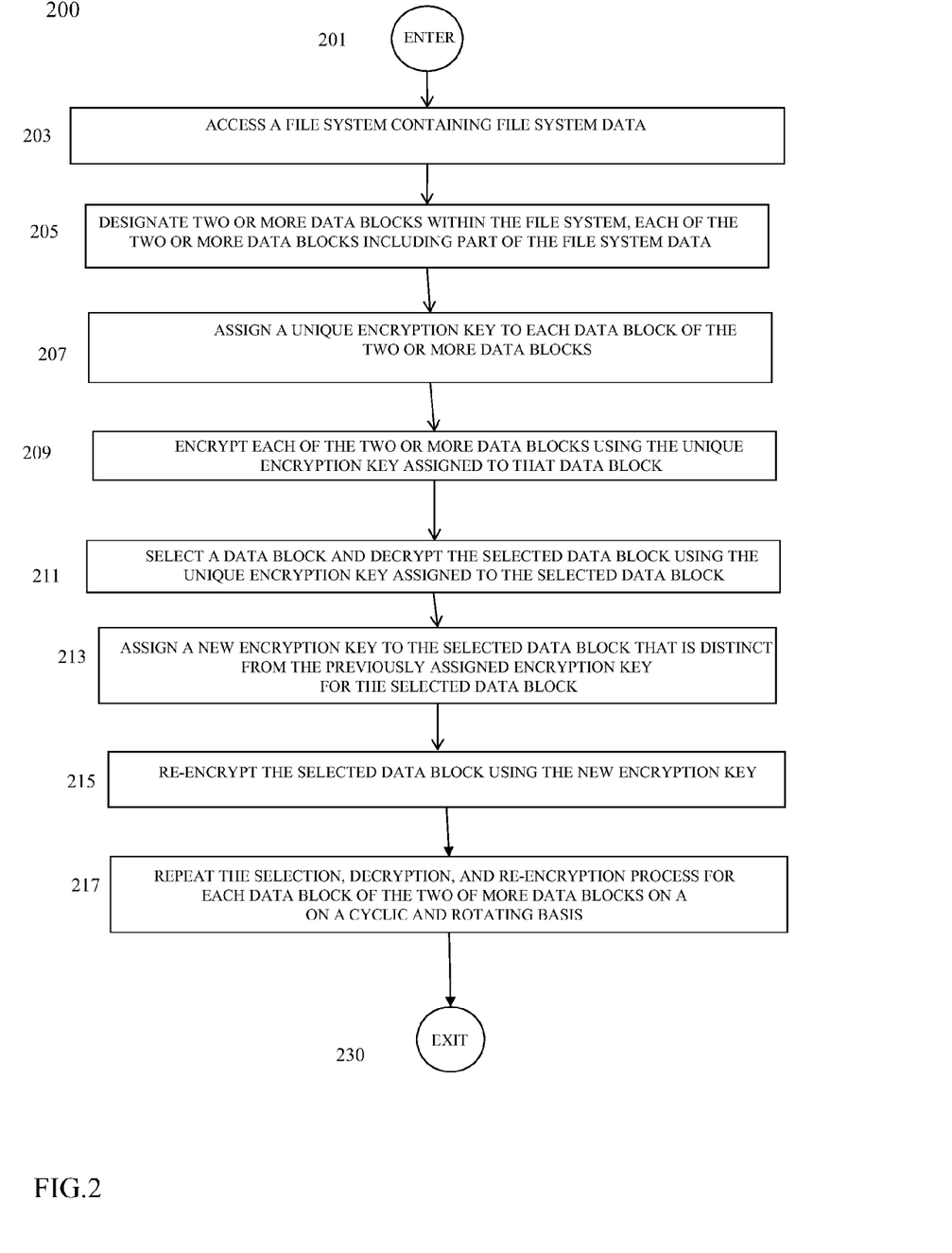
FIG. 2 is a flow chart depicting a process for providing a rotating key encrypted file system in accordance with one embodiment.

Process 200 for providing a rotating key encrypted file system begins at ENTER OPERATION 201 of FIG. 2 and process flow proceeds to ACCESS A FILE SYSTEM CONTAINING FILE SYSTEM DATA OPERATION 203.

In one embodiment, at ACCESS A FILE SYSTEM CONTAINING FILE SYSTEM DATA OPERATION 203 access to a file system containing file system data is obtained.

In various embodiments, the file system containing file system data accessed at ACCESS A FILE SYSTEM CONTAINING FILE SYSTEM DATA OPERATION 203 can be any file system as discussed herein, and/or as known in the art at the time of filing, and/or as developed after the time of filing. As a specific illustrative example, in one embodiment, the file system containing the file system data accessed at ACCESS A FILE SYSTEM CONTAINING FILE SYSTEM DATA OPERATION 203 is an Amazon Web Services (AWS) Elastic Compute Cloud (EC2) file system.

In one embodiment, once access to a file system containing file system data is obtained at ACCESS A FILE SYSTEM CONTAINING FILE SYSTEM DATA OPERATION 203 process flow proceeds to DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205.

In one embodiment, at DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205 two or more data blocks within the file system of ACCESS A FILE SYSTEM CONTAINING FILE SYSTEM DATA OPERATION 203 are designated, each of the two or more data blocks including one or more parts of the file system data.

As a specific illustrative example, in one embodiment, "N" data blocks are designated within the file system at DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205, where "N" is a whole number greater than one.

In this manner, at DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205 the file system, and file system data, is partitioned into multiple distinct data blocks.

In one embodiment, once two or more data blocks within the file system of ACCESS A FILE SYSTEM CONTAINING FILE SYSTEM DATA OPERATION 203 are designated at DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205, process flow proceeds to ASSIGN A UNIQUE ENCRYPTION KEY TO EACH DATA BLOCK OF THE TWO OR MORE DATA BLOCKS OPERATION 207.

In one embodiment, at ASSIGN A UNIQUE ENCRYPTION KEY TO EACH DATA BLOCK OF THE TWO OR MORE DATA BLOCKS OPERATION 207 a unique encryption key is assigned to each data block of the two or more data blocks of DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205, with the encryption key assigned to each data block being distinct from other encryption keys used to encrypt the other data blocks of the two or more data blocks within the file system.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned.

In one embodiment, once a unique encryption key is assigned to each data block of the two or more data blocks of DESIGNATE TWO OR MORE DATA BLOCKS WITHIN THE FILE SYSTEM, EACH OF THE TWO OR MORE DATA BLOCKS INCLUDING PART OF THE FILE SYS- TEM DATA OPERATION 205 at ASSIGN A UNIQUE ENCRYPTION KEY TO EACH DATA BLOCK OF THE TWO OR MORE DATA BLOCKS OPERATION 207, process flow proceeds to ENCRYPT EACH OF THE TWO OR MORE DATA BLOCKS USING THE UNIQUE ENCRYPTION KEY ASSIGNED TO THAT DATA BLOCK OPERATION 209.

In one embodiment, at ENCRYPT EACH OF THE TWO OR MORE DATA BLOCKS USING THE UNIQUE ENCRYPTION KEY ASSIGNED TO THAT DATA BLOCK OPERATION 209 each of the two or more data blocks of DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205 is initially encrypted using the unique encryption key assigned to each data block at ASSIGN A UNIQUE ENCRYPTION KEY TO EACH DATA BLOCK OF THE TWO OR MORE DATA BLOCKS OPERATION 207.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted at ENCRYPT EACH OF THE TWO OR MORE DATA BLOCKS USING THE UNIQUE ENCRYPTION KEY ASSIGNED TO THAT DATA BLOCK OPERATION 209 using their respective ones of the "N+1" encryption keys.

In one embodiment, once each of the two or more data blocks of DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205 is initially encrypted using the unique encryption key assigned to each data block at ASSIGN A UNIQUE ENCRYPTION KEY TO EACH DATA BLOCK OF THE TWO OR MORE DATA BLOCKS OPERATION 207 at ENCRYPT EACH OF THE TWO OR MORE DATA BLOCKS USING THE UNIQUE ENCRYPTION KEY ASSIGNED TO THAT DATA BLOCK OPERATION 209, process flow proceeds to SELECT A DATA BLOCK AND DECRYPT THE SELECTED DATA BLOCK USING THE UNIQUE ENCRYPTION KEY ASSIGNED TO THE SELECTED DATA BLOCK OPERATION 211.

In one embodiment, at SELECT A DATA BLOCK AND DECRYPT THE SELECTED DATA BLOCK USING THE UNIQUE ENCRYPTION KEY ASSIGNED TO THE SELECTED DATA BLOCK OPERATION 211 one of the two or more data blocks within the file system is selected and decrypted using the unique encryption key assigned to the selected data block at ASSIGN A UNIQUE ENCRYPTION KEY TO EACH DATA BLOCK OF THE TWO OR MORE DATA BLOCKS OPERATION 207.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted using their respective ones of the "N+1" encryption keys. Then, a selected one of the "N" data blocks is decrypted using its aging/old, or previously, assigned, one of the "N+1" encryption keys at SELECT A DATA BLOCK AND DECRYPT THE SELECTED DATA BLOCK USING THE UNIQUE ENCRYPTION KEY ASSIGNED TO THE SELECTED DATA BLOCK OPERATION 211.

In one embodiment, once one of the two or more data blocks within the file system is selected and decrypted using the unique encryption key assigned to the selected data block at ASSIGN A UNIQUE ENCRYPTION KEY TO EACH DATA BLOCK OF THE TWO OR MORE DATA BLOCKS OPERATION 207 at SELECT A DATA BLOCK AND DECRYPT THE SELECTED DATA BLOCK USING THE UNIQUE ENCRYPTION KEY ASSIGNED TO THE SELECTED DATA BLOCK OPERATION 211, process flow proceeds to ASSIGN A NEW ENCRYPTION KEY TO THE SELECTED DATA BLOCK THAT IS DISTINCT FROM THE PREVIOUSLY ASSIGNED ENCRYPTION KEY FOR THE SELECTED DATA BLOCK OPERATION 213.

In one embodiment, at ASSIGN A NEW ENCRYPTION KEY TO THE SELECTED DATA BLOCK THAT IS DISTINCT FROM THE PREVIOUSLY ASSIGNED ENCRYPTION KEY FOR THE SELECTED DATA BLOCK OPERATION 213, a new encryption key, distinct from the aging/old, or previously assigned, encryption key of ASSIGN A UNIQUE ENCRYPTION KEY TO EACH DATA BLOCK OF THE TWO OR MORE DATA BLOCKS OPERATION 207, is assigned to the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted using their respective ones of the "N+1" encryption keys. Then, a selected one of the "N" data blocks is decrypted using its aging/old, or previously, assigned, one of the "N+1" encryption keys. Then, the previously unassigned "+1" encryption key of the "N+1" encryption keys is assigned to the selected data block as a new encryption key.

In one embodiment, once a new encryption key, distinct from the aging/old, or previously assigned, encryption key of ASSIGN A UNIQUE ENCRYPTION KEY TO EACH DATA BLOCK OF THE TWO OR MORE DATA BLOCKS OPERATION 207, is assigned to the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211 at ASSIGN A NEW ENCRYPTION KEY TO THE SELECTED DATA BLOCK THAT IS DISTINCT FROM THE PREVIOUSLY ASSIGNED ENCRYPTION KEY FOR THE SELECTED DATA BLOCK OPERATION 213, process flow proceeds to RE-ENCRYPT THE SELECTED DATA BLOCK USING THE NEW ENCRYPTION KEY OPERATION 215.

In one embodiment, at RE-ENCRYPT THE SELECTED DATA BLOCK USING THE NEW ENCRYPTION KEY OPERATION 215 the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211 is re-encrypted using the new encryption key, distinct from the aging/old, or previously assigned, encryption key of ASSIGN A NEW ENCRYPTION KEY TO THE SELECTED DATA BLOCK THAT IS DISTINCT FROM THE PREVIOUSLY ASSIGNED ENCRYPTION KEY FOR THE SELECTED DATA BLOCK OPERATION 213.

As a specific illustrative example, in one embodiment, "N" data blocks are designated within the file system, where "N" is a whole number greater than one, and "N+1" unique encryption keys are provided with one of the "N+1" unique encryption keys being assigned to a respective one of the "N" data blocks and with a "+1" encryption key being temporarily unassigned. In this specific illustrative example, the "N" data blocks are then initially encrypted using their respective ones of the "N+1" encryption keys. Then, a selected one of the "N" data blocks is decrypted using its aging/old, or previously, assigned, one of the "N+1" encryption keys. Then, the previously unassigned "+1" encryption key of the "N+1" encryption keys is assigned to the selected data block as a new encryption key and the selected one of the "N" data blocks is re-encrypted using the new, or "+1" encryption key.

In one embodiment, once the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211 is re-encrypted using the new encryption key, distinct from the aging/old, or previously assigned, encryption key of ASSIGN A NEW ENCRYPTION KEY TO THE SELECTED DATA BLOCK THAT IS DISTINCT FROM THE PREVIOUSLY ASSIGNED ENCRYPTION KEY FOR THE SELECTED DATA BLOCK OPERATION 213 at RE-ENCRYPT THE SELECTED DATA BLOCK USING THE NEW ENCRYPTION KEY OPERATION 215, process flow proceeds to REPEAT THE SELECTION, DECRYPTION, AND RE-ENCRYPTION PROCESS FOR EACH DATA BLOCK OF THE TWO OF MORE DATA BLOCKS ON A CYCLIC AND ROTATING BASIS OPERATION 217.

In one embodiment, at REPEAT THE SELECTION, DECRYPTION, AND RE-ENCRYPTION PROCESS FOR EACH DATA BLOCK OF THE TWO OF MORE DATA BLOCKS ON A CYCLIC AND ROTATING BASIS OPERATION 217 the process of selecting one of the two or more data blocks within the file system of and decrypting the selected data block using the distinct encryption key assigned to the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211, and then re-encrypting the selected data block using a new encryption key that is distinct from the previously assigned encryption key of RE-ENCRYPT THE SELECTED DATA BLOCK USING THE NEW ENCRYPTION KEY OPERATION 215 is repeated for each data block on a sequential/cyclic and continually rotating basis such that, at any given time, only one data block of the two or more data blocks within the file system is being encrypted using a new encryption key, e.g., is being rekeyed.

In one embodiment, once the process of selecting one of the two or more data blocks within the file system of and decrypting the selected data block using the distinct encryption key assigned to the selected data block of SELECT A DATA BLOCK AND DECRYPT THE SELECTED DATA BLOCK USING THE UNIQUE ENCRYPTION KEY ASSIGNED TO THE SELECTED DATA BLOCK OPERATION 211, and then re-encrypting the selected data block using a new encryption key that is distinct from the previously assigned encryption key of RE-ENCRYPT THE SELECTED DATA BLOCK USING THE NEW ENCRYPTION KEY OPERATION 215 is repeated for each data block on a sequential/cyclic and continually rotating basis such that, at any given time, only one data block of the two or more data blocks within the file system is being encrypted using a new encryption key, e.g., is being rekeyed at REPEAT THE SELECTION, DECRYPTION, AND RE-ENCRYPTION PROCESS FOR EACH DATA BLOCK OF THE TWO OF MORE DATA BLOCKS ON A CYCLIC AND ROTATING BASIS OPERATION 217, process flow proceeds to EXIT OPERATION 230.

In one embodiment, at EXIT OPERATION 230, process 200 for providing a rotating key encrypted file system is exited to await new data.

As a specific illustrative example of one embodiment of one implementation of process 200 for providing a rotating key encrypted file system, assume the file system of ACCESS A FILE SYSTEM CONTAINING FILE SYSTEM DATA OPERATION 203 is implemented/operated in a Linux operating system environment and, more particularly, is implemented as an Amazon Web Services (AWS) Elastic Compute Cloud (EC2) file system.

In this specific illustrative example, process 200 for providing a rotating key encrypted file system is a kernel-based system residing between the upper virtual file system layers and the low-level block device driver to implement transparent encryption and decryption. However, in other illustrative examples and embodiments, process 200 for providing a rotating key encrypted file system is independent of the file system type.

As noted, in this specific illustrative example, the file system is virtually divided into "N" data blocks at DESIGNATE TWO OR MORE DATA BLOCKS WITHIN THE FILE SYSTEM, EACH OF THE TWO OR MORE DATA BLOCKS INCLUDING PART OF THE FILE SYSTEM DATA OPERATION 205 with each data block containing one or more parts of the file system data.

As also noted above, in this specific illustrative example, at ASSIGN A UNIQUE ENCRYPTION KEY TO EACH DATA BLOCK OF THE TWO OR MORE DATA BLOCKS OPERATION 207 and ENCRYPT EACH OF THE TWO OR MORE DATA BLOCKS USING THE UNIQUE ENCRYPTION KEY ASSIGNED TO THAT DATA BLOCK OPERATION 209 "N+1" encryption keys are used to protect the designated "N" data blocks with the "+1", or previously unassigned, encryption key being used to replace an aging/old one of the "N" encryption keys assigned to a selected one of the "N" data blocks during a rekeying process of the selected one of the "N" data blocks.

In this specific illustrative example, Linux CryptoAPI is used to encrypt and or decrypt each of the "N" data blocks. In one embodiment, each of the assigned "N" encryption keys of ASSIGN A UNIQUE ENCRYPTION KEY TO EACH DATA BLOCK OF THE TWO OR MORE DATA BLOCKS OPERATION 207 is used to protect continuous parts in the data blocks.

In one embodiment, the "N" data blocks are re-keyed, e.g., the data blocks are decrypted and then re-encrypted, on a cyclic and continually rotating basis at REPEAT THE SELECTION, DECRYPTION, AND RE-ENCRYPTION PROCESS FOR EACH DATA BLOCK OF THE TWO OF MORE DATA BLOCKS ON A CYCLIC AND ROTATING BASIS OPERATION 217 using an automatic rekeying daemon, in one embodiment, called "Autorekee", running in a low priority mode such that at any given time only one data block of the two or more data blocks within the file system is being encrypted using a new encryption key. To this end, a part of a selected data block that is being re-keyed, will have two associated encryption keys; the previously assigned, or old/aging, encryption key and the new encryption key.

In this specific illustrated example, it is required that the encryption keys not remain within the AWS. Consequently, a REpresentational State Transfer (REST) service that will only respond to the AWS instance is provided. In this specific illustrative example, during the EC2 boot time, the process for providing a rotating key encrypted file system retrieves the encryption keys from the REST service. In this specific illustrative example, the encryption keys are mapped to a given Elastic Block Store IDentifcation (EBSID). In the specific illustrative example, the REST service is also used to send out the new, i.e., the "+1" encryption key and retire the old/aging, i.e., previously assigned, encryption key.

In one embodiment of this specific illustrative example, process 200 for providing a rotating key encrypted file system leverages the superblock to store metadata such as the total number of encryption keys, i.e., the value of the number "N+1"; the total number of data blocks, i.e., the value of the number "N"; the name of the previously assigned, i.e., aging or old, encryption key and the new encryption key; and/or the last block number that was rekeyed.

In one embodiment of this specific illustrative example, the metadata allows process 200 for providing a rotating key encrypted file system to keep track of which data block is being protected by two encryption keys, i.e., the old encryption key and the new encryption key, and which data block can be accessed with which encryption key, i.e., old or new.

In this specific illustrative example, process 200 for providing a rotating key encrypted file system leverages the page cache and bio infrastructure of the kernel to provide transparent encryption and decryption of the data using the encryption keys present in the kernel key management service.

In some cases, the work queue interface is used to enable the coalescing of multiple bio requests to reduce the overhead of individual bio requests for file system blocks. In other embodiments, similar implementations used by other encryption file systems, such as dm-crypt, are accommodated.

In instances where the encrypted file system data must be maintained in a page cache, encryption and decryption can be implemented to copy the data between the page cache and the user space buffer specified in the read/write and or other system calls.

For the relatively rare situations where input-output (I/O) access is made to a part of a data block that is currently being rekeyed, the I/O call is held off until the rekeying process is finished on that part of the data block. When the rekeying process is completed the block can then be accessed with the new encryption key.

In this specific illustrative example, a daemon called "Autorekee" runs continuously in the background of the AWS instance. The primary task of the Autorekee is to continuously rekey the data blocks with a new encryption key. In one embodiment, the Autorekee daemon works through each of the "N" data blocks in a sequential, and cyclic, manner.

A specific illustrative example of one algorithm used to generate the Autorekee daemon is represented by the following pseudo-code:

1. aging_key=get_current_aging_key( );
2. new_key=get_new_key( );
3. current_block=next_block(get_last_rekeyed_block( ));
4. while (true) {
5. rekey(current_block, aging_key, new_key);
6. current_block=next_block(current_block);
7. if (is_start_block_of_aging_section(current_block) {
8. new_key=retrieve_new_key_and_delete_old_key(
9. aging_key, EBS_ID)
10. aging_key=next_aging_key(aging_key)
11. }
12. }

In the Autorekee daemon pseudo code presented above, lines 1 through 3 are initialization statements, with line 3 retrieving the data block being rekeyed.

In the Autorekee daemon pseudo code presented above, line 5 performs the actual rekey which involves decrypting the data block with the aging, or previously assigned, encryption key and re-encrypting the data block with the new encryption key.

In the Autorekee daemon pseudo code presented above, lines 7 to 10 contain the logic for when a new part within a data block, or a data block, is reached. As seen in lines 8 to 10, if the current data block is the beginning of a new section, the current aging, or previously assigned, encryption key, and the new encryption key are associated with the next key pair.

The Autorekee daemon pseudo code presented above also handles cases where the Autorekee crashes and needs to resume. The progress of the Autorekee's location is continuously tracked as metadata in the superblocks. When the last part of the last data block is reached, Autorekee begins the rekeying process again at the first data block.

In this specific illustrative example, process 200 for providing a rotating key encrypted file system utilizes keyed hashes to enforce file integrity. In one embodiment, the hash list for a file consists of a separate message authentication code computed for every data block used by that file's contents. In one embodiment, this code is verified on every read and updated on every write operation on the corresponding data block. In one embodiment, the top hash, computed over the hash list itself, must be verified or updated for every read or write call.

As noted above, the specific illustrative example discussed above is but one illustrative example of one implementation of one embodiment of the process for providing a rotating key encrypted file system. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using the process 200 for providing a rotating key encrypted file system discussed herein, the risk of file system data being compromised is significantly reduced by having the encryption keys continuously rotated throughout the file system. Consequently, the Time-To-Live (TTL) for each encryption key is extremely short. As a result, even if the encryption key were compromised, the attacker would only have a very short window to gain access to one section, i.e., one data block, of the file system.

In addition, using process 200 for providing a rotating key encrypted file system discussed herein, performance and data accessibility are negligibly affected with only minor overhead being added. Consequently, using process 200 for providing a rotating key encrypted file system discussed herein, encryption keys can be changed more frequently without the entirety of the encrypted data being inaccessible for any significant period of time and without interrupting live traffic or consuming significant amounts of processor power and other resources.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a rotating key encrypted file system comprising the following, which when executed individually or collectively by any set of one or more processors perform a process including:
    obtaining access to a file system containing file system data;
    designating three or more data blocks within the file system, each of the three or more data blocks including part of the file system data;
    determining a number of encryption keys greater than the number of designated data blocks;
    assigning an encryption key of the determined encryption keys to each data block of the three or more data blocks, the encryption key assigned to each data block being distinct from other encryption keys used to encrypt the other data blocks of the three or more data blocks within the file system;

initially encrypting each of the three or more data blocks within the file system using the distinct encryption key assigned to that data block;

selecting one of the three or more data blocks within the file system and decrypting the selected data block using the distinct encryption key assigned to the selected data block and then re-encrypting the selected data block using a new encryption key that is distinct from the previously assigned encryption key and is also distinct from any other encryption key assigned to any of the three or more data blocks; and repeating the selection of one of the three or more data blocks within the file system and decrypting the selected data block using the distinct encryption key assigned to the selected data block and then re-encrypting the selected data block using a new encryption key of the determined encryption keys that is distinct from any encryption key currently assigned to any of the data blocks and is also distinct from the previously assigned encryption key on a cyclic and rotating basis such that at any given time only one data block of the three or more data blocks within the file system is being encrypted using a new encryption key that is distinct from the previously assigned encryption key.

2. The computing system implemented method for providing a rotating key encrypted file system of claim 1 wherein the computing system implemented method for providing a rotating key encrypted file system is implemented in a Linux environment.

3. The computing system implemented method for providing a rotating key encrypted file system of claim 1 wherein the file system is an Amazon Web Services (AWS) file system.

4. The computing system implemented method for providing a rotating key encrypted file system of claim 1 wherein repeating the selection of one of the three or more data blocks within the file system and decrypting the selected data block using the distinct encryption key assigned to the selected data block and then re-encrypting the selected data block using a new encryption key that is distinct from the previously assigned encryption key on a cyclic and rotating basis such that at any given time only one data block of the three or more data blocks within the file system is being encrypted using a new encryption key that is distinct from the previously assigned encryption key is performed using an automatic rekeying daemon.

5. A computing system implemented method for providing a rotating key encrypted file system comprising the following, which when executed individually or collectively by any set of one or more processors perform a process including:

obtaining access to a file system containing file system data;

designating "N" data blocks within the file system, where "N" represents a number greater than two, and each data block includes part of the file system data;

providing "N+1" different encryption keys;

assigning a unique one of the "N+1" encryption keys to each data block of the "N" data blocks within the file system;

initially encrypting each data block within the file system using the unique one of the "N+1" encryption keys assigned to that data block;

selecting one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block and is also distinct from any other encryption key assigned to any of the three or more data blocks;

repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from any encryption key currently assigned to any of the data blocks and is also distinct from the unique one of the "N+1" encryption keys previously assigned to the selected data block on a cyclic and rotating basis such that at any given time only one data block of the "N" data blocks within the file system is being encrypted using a new one of the "N+1" encryption keys.

6. The computing system implemented method for providing a rotating key encrypted file system of claim 5 wherein the computing system implemented method for providing a rotating key encrypted file system is implemented in a Linux environment.

7. The computing system implemented method for providing a rotating key encrypted file system of claim 5 wherein the file system is an Amazon Web Services (AWS) file system.

8. The computing system implemented method for providing a rotating key encrypted file system of claim 5 wherein repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block on a cyclic and rotating basis such that at any given time only one data block of the "N" data blocks within the file system is being encrypted using a new one of the "N+1" encryption keys is performed using an automatic rekeying daemon.

9. A system for providing a rotating key encrypted file system comprising:

at least one processor; and at least one memory coupled to the at least one processor, the at least one memory having stored therein instructions which when executed by any set of the one or more processors, perform a process for providing a rotating key encrypted file system, the process for providing a rotating key encrypted file system including:

obtaining access to a file system containing file system data;

designating three or more data blocks within the file system, each of the three or more data blocks including part of the file system data;

determining a number of encryption keys greater than the number of designated data blocks;

assigning an encryption key of the determined encryption keys to each data block of the three or more data blocks, the encryption key assigned to each data block being distinct from other encryption keys used to encrypt the other data blocks of the three or more data blocks within the file system;

initially encrypting each of the three or more data blocks within the file system using the distinct encryption key assigned to that data block;

selecting one of the three or more data blocks within the file system and decrypting the selected data block using the distinct encryption key assigned to the selected data block and then re-encrypting the selected data block using a new encryption key that is distinct from the previously assigned encryption key and is also distinct from any other encryption key assigned to any of the three or more data blocks; and repeating the selection of one of the three or more data blocks within the file system and decrypting the selected data block using the distinct encryption key assigned to the selected data block and then re-encrypting the selected data block using a new encryption key of the determined encryption keys that is distinct from any encryption key currently assigned to any of the data blocks and is also distinct from the previously assigned encryption key on a cyclic and rotating basis such that at any given time only one data block of the three or more data blocks within the file system is being encrypted using a new encryption key that is distinct from the previously assigned encryption key.

10. The system for providing a rotating key encrypted file system of claim 9 wherein the process for providing a rotating key encrypted file system is implemented in a Linux environment.

11. The system for providing a rotating key encrypted file system of claim 9 wherein the file system is an Amazon Web Services (AWS) file system.

12. The system for providing a rotating key encrypted file system of claim 9 wherein repeating the selection of one of the three or more data blocks within the file system and decrypting the selected data block using the distinct encryption key assigned to the selected data block and then re-encrypting the selected data block using a new encryption key that is distinct from the previously assigned encryption key on a cyclic and rotating basis such that at any given time only one data block of the three or more data blocks within the file system is being encrypted using a new encryption key that is distinct from the previously assigned encryption key is performed using an automatic rekeying daemon.

13. A system for providing a rotating key encrypted file system comprising:
  at least one processor; and
  at least one memory coupled to the at least one processor, the at least one memory having stored therein instructions which when executed by any set of the one or more processors, perform a process for providing a rotating key encrypted file system, the process for providing a rotating key encrypted file system including:
    obtaining access to a file system containing file system data;
    designating "N" data blocks within the file system, where "N" represents a number greater than two, and each data block includes part of the file system data;
    providing "N+1" different encryption keys;
    assigning a unique one of the "N+1" encryption keys to each data block of the "N" data blocks within the file system;
    initially encrypting each data block within the file system using the unique one of the "N+1" encryption keys assigned to that data block;
    selecting one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block and is also distinct from any other encryption key assigned to any of the three or more data blocks;
    repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from any encryption key currently assigned to any of the data blocks and is also distinct from the unique one of the "N+1" encryption keys previously assigned to the selected data block on a cyclic and rotating basis such that at any given time only one data block of the "N" data blocks within the file system is being encrypted using a new one of the "N+1" encryption keys.

14. The system for providing a rotating key encrypted file system of claim 13 wherein the process for providing a rotating key encrypted file system is implemented in a Linux environment.

15. The system for providing a rotating key encrypted file system of claim 13 wherein the file system is an Amazon Web Services (AWS) file system.

16. The system for providing a rotating key encrypted file system of claim 13 wherein repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block on a cyclic and rotating basis such that at any given time only one data block of the "N" data blocks within the file system is being encrypted using a new one of the "N+1" encryption keys is performed using an automatic rekeying daemon.

17. A computer program product for providing a rotating key encrypted file system comprising:
  a nontransitory computer readable medium;
  and computer program code, encoded on the computer readable medium, comprising computer readable instructions which, when executed via any set of one or more processors, perform the following:
    obtaining access to a file system containing file system data;
    designating three or more data blocks within the file system, each of the three or more data blocks including part of the file system data;
    determining a number of encryption keys greater than the number of designated data blocks;
    assigning an encryption key of the determined encryption keys to each data block of the three or more data blocks, the encryption key assigned to each data block being distinct from other encryption keys used to encrypt the other data blocks of the three or more data blocks within the file system;
    initially encrypting each of the three or more data blocks within the file system using the distinct encryption key assigned to that data block;
    selecting one of the three or more data blocks within the file system and decrypting the selected data block using the distinct encryption key assigned to the selected data block and then re-encrypting the selected data block using a new encryption key that is distinct from the previously assigned encryption key and is also distinct from any other encryption key assigned to any of the three or more data blocks; and
    repeating the selection of one of the three or more data blocks within the file system and decrypting the selected data block using the distinct encryption key assigned to the selected data block and then re-encrypting the selected data block using a new encryption key of the determined encryption keys that is distinct from any encryption key currently assigned to any of the data blocks and is also distinct from the previously assigned encryption key on a cyclic and rotating basis such that at any given time only one data block of the three or more data blocks within the file system is being encrypted using a new encryption key that is distinct from the previously assigned encryption key.

18. The computer program product for providing a rotating key encrypted file system of claim 17 wherein the computer program product for providing a rotating key encrypted file system is implemented in a Linux environment.

19. The computer program product for providing a rotating key encrypted file system of claim 17 wherein the file system is an Amazon Web Services (AWS) file system.

20. The computer program product for providing a rotating key encrypted file system of claim 17 wherein repeating the selection of one of the three or more data blocks within the file system and decrypting the selected data block using the distinct encryption key assigned to the selected data block and then re-encrypting the selected data block using a new encryption key that is distinct from the previously assigned encryption key on a cyclic and rotating basis such that at any given time only one data block of the three or more data blocks within the file system is being encrypted using a new encryption key that is distinct from the previously assigned encryption key is performed using an automatic rekeying daemon.

21. A computer program product for providing a rotating key encrypted file system comprising:
   a nontransitory computer readable medium;
   and computer program code, encoded on the computer readable medium, comprising computer readable instructions which, when executed via any set of one or more processors, perform the following:
   obtaining access to a file system containing file system data;
   designating "N" data blocks within the file system, where "N" represents a number greater than one, and each data block includes part of the file system data;
   providing "N+1" different encryption keys;
   assigning a unique one of the "N+1" encryption keys to each data block of the "N" data blocks within the file system;
   initially encrypting each data block within the file system using the unique one of the "N+1" encryption keys assigned to that data block;
   selecting one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block and is also distinct from any other encryption key assigned to any of the three or more data blocks;
   repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from any encryption key currently assigned to any of the data blocks and is also distinct from the unique one of the "N+1" encryption keys previously assigned to the selected data block on a cyclic and rotating basis such that at any given time only one data block of the "N" data blocks within the file system is being encrypted using a new one of the "N+1" encryption keys.

22. The computer program product for providing a rotating key encrypted file system of claim 21 wherein the computer program product for providing a rotating key encrypted file system is implemented in a Linux environment.

23. The computer program product for providing a rotating key encrypted file system of claim 21 wherein the file system is an Amazon Web Services (AWS) file system.

24. The computer program product for providing a rotating key encrypted file system of claim 21 wherein repeating the selection of one of the "N" data blocks within the file system and decrypting the selected data block using the unique one of the "N+1" encryption keys assigned to the selected data block and then re-encrypting the selected data block using a new one of the "N+1" encryption keys that is distinct from the unique one of the "N+1" encryption keys previously assigned to the selected data block on a cyclic and rotating basis such that at any given time only one data block of the "N" data blocks within the file system is being encrypted using a new one of the "N+1" encryption keys is performed using an automatic rekeying daemon.

\* \* \* \* \*